United States Patent
Kim et al.

(10) Patent No.: US 12,393,415 B2
(45) Date of Patent: Aug. 19, 2025

(54) METHOD AND APPARATUS FOR CONTROLLING VIRTUALIZED VEHICLE STRUCTURE-BASED SYSTEM

(71) Applicant: DRIMAES, INC., Daegu (KR)

(72) Inventors: Yong Kyung Kim, Gyeonggi-do (KR); Won Lee, Seoul (KR); Hyun Duk Choi, Gyeonggi-do (KR); Yevgeny Hong, Seoul (KR)

(73) Assignee: DRIMAES, INC., Daegu (KR)

( * ) Notice: Subject to any disclaimer, the term of this patent is extended or adjusted under 35 U.S.C. 154(b) by 70 days.

(21) Appl. No.: 18/029,127

(22) PCT Filed: Nov. 27, 2020

(86) PCT No.: PCT/KR2020/017113
§ 371 (c)(1),
(2) Date: Mar. 29, 2023

(87) PCT Pub. No.: WO2022/114291
PCT Pub. Date: Jun. 2, 2022

(65) Prior Publication Data
US 2023/0367579 A1 Nov. 16, 2023

(51) Int. Cl.
*G06F 8/65* (2018.01)
(52) U.S. Cl.
CPC .................................... *G06F 8/65* (2013.01)
(58) Field of Classification Search
CPC ......................................................... G06F 8/65
See application file for complete search history.

(56) References Cited

U.S. PATENT DOCUMENTS

| | | | | |
|---|---|---|---|---|
| 10,169,023 | B2* | 1/2019 | Ciano | G06F 8/61 |
| 10,360,020 | B2* | 7/2019 | Hirshberg | G06F 8/656 |
| 10,740,132 | B2* | 8/2020 | Goel | G06F 9/545 |
| 10,802,481 | B1* | 10/2020 | Menon | G06F 8/71 |
| 11,029,975 | B2* | 6/2021 | Prasad | G06F 9/44526 |
| 11,403,086 | B2* | 8/2022 | Philippov | G06F 8/65 |
| 12,060,075 | B2* | 8/2024 | Lee | G06F 9/455 |
| 2011/0239209 | A1* | 9/2011 | Kotani | H04L 9/3297 717/171 |
| 2012/0143402 | A1 | 6/2012 | Kim | |
| 2014/0181816 | A1* | 6/2014 | Muller | G06F 9/45558 718/1 |

(Continued)

FOREIGN PATENT DOCUMENTS

| | | |
|---|---|---|
| KR | 10-2020-0019565 | 2/2020 |
| WO | WO 2022/114291 | 6/2022 |

OTHER PUBLICATIONS

International Search Report and the Written Opinion Dated Aug. 24, 2021 From the International Searching Authority Re. Application No. PCT/KR2020/017113 and Its Translation of Search Report Into English. (11 Pages).

(Continued)

*Primary Examiner* — Douglas M Slachta

(57) ABSTRACT

Embodiments disclose a virtualized vehicle structure-based control method including booting a plurality of containers, determining a necessity for upgrade of the plurality of the containers, and upgrading the plurality of the containers based on the necessity for upgrade, wherein the plurality of the containers share initialization and management.

9 Claims, 16 Drawing Sheets

(56) References Cited

U.S. PATENT DOCUMENTS

| | | | |
|---|---|---|---|
| 2016/0139737 A1* | 5/2016 | Conn | G06F 3/0481 |
| | | | 715/802 |
| 2016/0182315 A1* | 6/2016 | Salokanto | H04L 67/51 |
| | | | 709/226 |
| 2016/0371105 A1* | 12/2016 | Sieffert | G06F 8/656 |
| 2018/0039489 A1* | 2/2018 | Shiraishi | G06F 11/3055 |
| 2018/0060057 A1* | 3/2018 | Dake | G06F 9/45516 |
| 2018/0336026 A1* | 11/2018 | Park | H04L 67/34 |
| 2019/0235897 A1* | 8/2019 | Goel | G06F 9/45545 |
| 2019/0274018 A1* | 9/2019 | Mosenia | G06F 8/65 |
| 2020/0057630 A1* | 2/2020 | Cho | G06F 8/65 |
| 2021/0146950 A1* | 5/2021 | Lee | G06F 9/455 |

OTHER PUBLICATIONS

Masek et al. "Container Based Virtualisation for Software Deployment in Self-Driving Vehicles", Master's Thesis in Software Engineering, Department of Computer Science and Engineering, Chalmers University of Technology, Gothenburg, Sweden, p. 1-62, Apr. 2016.

Morabito et al. "Lightweight Virtualization as Enabling Technology for Future Smart Cars", 2017 IFIP/IEEE Symposium on Integrated Network Management, IM, Lisbon, Portugal, May 8-12, 2017, 9 P., May 8, 2017.

Wang et al. "Adapting A Container Infrastructure for Autonomous Vehicle Development", ArXiv Preprint ArXiv: 1911.01075v2, 6 P., Nov. 19, 2019.

* cited by examiner

METHOD AND APPARATUS FOR CONTROLLING VIRTUALIZED VEHICLE STRUCTURE-BASED SYSTEM

RELATED APPLICATIONS

This application is a National Phase of PCT Patent Application No. PCT/KR2020/017113 having International filing date of Nov. 27, 2020, the contents of which are incorporated by reference as if fully set forth herein in their entirety.

FIELD AND BACKGROUND OF THE INVENTION

Embodiments of the present invention relate to a method and apparatus for controlling a virtualized vehicle structure-based system.

Vehicles are gradually moving towards higher levels of computerization. Most vehicle operations, functionalities, and processes can currently be computer-controlled or monitored through electronic systems. In other words, with the advent of the digital age, consumers can perform tasks within their vehicles that are similar to those performed between mobile phones and tablet computers. For example, vehicle infotainment systems equipped with intelligent user interfaces that include touch and haptic feedback, natural language voice interactions, proximity detection, and buttons and controls are becoming increasingly popular. As a result, information, communication, navigation, and entertainment systems are being simplified within vehicles and customized to better suit driving needs.

In line with these technological advances, multiple display devices exist within vehicles, and there are also numerous software programs that operate these display devices. Moreover, users or passengers in vehicles are experiencing increased freedom to use multiple display devices.

However, there are limitations to the update of operating systems and the independent use of user-specific web platform containers within vehicles.

Furthermore, there is an issue where the mixture of sounds between users within a vehicle can increase the risk of driving.

SUMMARY OF THE INVENTION

Embodiments may provide a method and apparatus for controlling a virtualized vehicle structure-based system that is capable of saving disk resources.

Also, it is possible to provide a method and apparatus for controlling a virtualized vehicle structure-based system that is capable of improving operation speed.

Also, it is possible to provide a method and apparatus for controlling a virtualized vehicle structure-based system customizable for a user in the vehicle.

Also, it is possible to provide a method and apparatus for controlling a virtualized vehicle structure-based system capable of facilitating use of user-specific web applications in the vehicle.

Also, it is possible to provide a method and apparatus for controlling a virtualized vehicle structure-based system capable of processing sound without driving disturbance.

The objects of the embodiments are not limited to those stated above, but also include objects or effects that can be deduced from the means for solving the problems or from the embodiments described below.

A control method based on a virtualized vehicle structure according to an embodiment includes booting a plurality of containers, determining a necessity for upgrade of the plurality of the containers, and upgrading the plurality of the containers based on the necessity for upgrade, wherein the plurality of the containers share initialization and management.

Determining a necessity for upgrade of the plurality of the containers may include receiving upgrade information, comparing the upgrade information with upgrades of the plurality of the containers, and determining the necessity for upgrade.

It is possible to further include operating the plurality of the containers based on absence of necessity for upgrade.

It is possible to further include determining, based on presence of the necessity for upgrade, whether the upgrade is an upgrade for a system directory or an upgrade for a user data (personal data).

It is possible to further include performing, based on the upgrade for the system directory, user authentication after determining the necessity for upgrade; and receiving the system directory.

It is possible to further include rebooting the plurality of containers and returning to determining a necessity for an upgrade.

It is possible to further include receiving, based on the upgrade for the user data, the latest user data after determining the necessity for upgrade and operating the plurality of the containers.

It is possible to further include executing an application with a display connected to the containers after operating the plurality of containers.

Operating the plurality of the containers may include copying a modified directory among the user data to operate the plurality of the containers.

The shared initialization and management may include a kernel, a distro, and a library.

In addition, a control method based on a virtualized vehicle structure according to an embodiment includes, after the above described update or the like, recognizing a user and determining whether the recognized user is a registered user for operating the containers.

It is possible to further include registering the recognized user when the recognized user is not the registered user.

It is possible to further include setting up, when the recognized user is the registered user, the vehicle environment and determining whether there is a registered web account.

It is possible to further include registering a web account when there is no registered web account.

It is possible to further include determining, when there is a registered web account, whether the registered web account is logged into another web platform container.

It is possible to further include displaying a log-out or re-login when the registered web account is logged into another web platform container.

It is possible to further include extracting preferred applications when the registered web account is not logged into another web platform container.

It is possible to further include driving the navigation and displaying a favorite destination.

A virtualized vehicle structure-based sound control method according to an embodiment may include receiving at least one of first sound output information from a first sound client and second sound output information from a second sound client, comparing priorities of the first sound output information and the second sound output information, and transmitting at least one of the first sound output information and the second sound output information to hardware based on the comparison result, wherein the first sound client and the second sound client are loaded on different virtual engines.

The first sound client may be loaded on a cluster operating system, and the second sound client may be loaded on an Audio Video Navigation (AVN) operating system, a Co-Driver operating system, or a Rear Seat Entertainment (RSE) operating system.

The priority of the first sound output information may be higher than the priority of the second sound output information.

It is possible to further include determining, after comparing the priorities, whether the first sound output information is generated while the vehicle is in motion.

It is possible to further include outputting the first sound output information and then outputting the second sound output information when the first sound output information is not generated while the vehicle is in motion.

It is possible to further include determining, when the first sound output information is generated while the vehicle is in motion, whether to output the first sound output information and the second sound output information and adjusting output timings based on the level of the first sound output information and outputting as determined and adjusted.

Levels of output information may include a first level and a second level lower than the first level, it is possible to further include outputting, when the level of the first sound output information is the first level, only the first sound output information and blocking the output of the second sound output information.

It is possible to further include outputting, when the level of the first sound output information is the second level, both the first and second sound output information for a first period of time and outputting the second sound output information continuously for a second period of time, wherein the volume of the first sound output information may be greater than that of the second sound output information during the first period.

It is possible to transmit the second sound output information to the hardware at the transmitting step when only the second sound output information is received.

A virtualized vehicle structure-based sound control device according to an embodiment may include a receiving unit that receives at least one of first sound output information from a first sound client and second sound output information from a second sound client, a comparing unit that compares the priority of the first sound output information and the received second sound output information, and a transmitting unit that transmits at least one of the first sound output information and the second sound output information to hardware based on the comparison result, wherein the first sound client and the second sound client are loaded on different virtual engines.

According to embodiments, it is possible to implement a method and apparatus for controlling a virtualized vehicle structure-based system that is capable of saving disk resources.

Also, it is possible to implement a method and apparatus for controlling a virtualized vehicle structure-based system that is capable of improving operation speed.

Also, it is possible to implement a method and apparatus for controlling a virtualized vehicle structure-based system customizable for a user in the vehicle.

Also, it is possible to implement a method and apparatus for controlling a virtualized vehicle structure-based system capable of facilitating use of user-specific web applications in the vehicle.

Also, it is possible to implement a method and apparatus for controlling a virtualized vehicle structure-based system capable of processing sound without driving disturbance.

The various and beneficial advantages and effects of this invention are not limited to the above, and will be more easily understood in the process of describing the specific embodiments of this invention.

DESCRIPTION OF SPECIFIC EMBODIMENTS OF THE INVENTION

Figure 1:
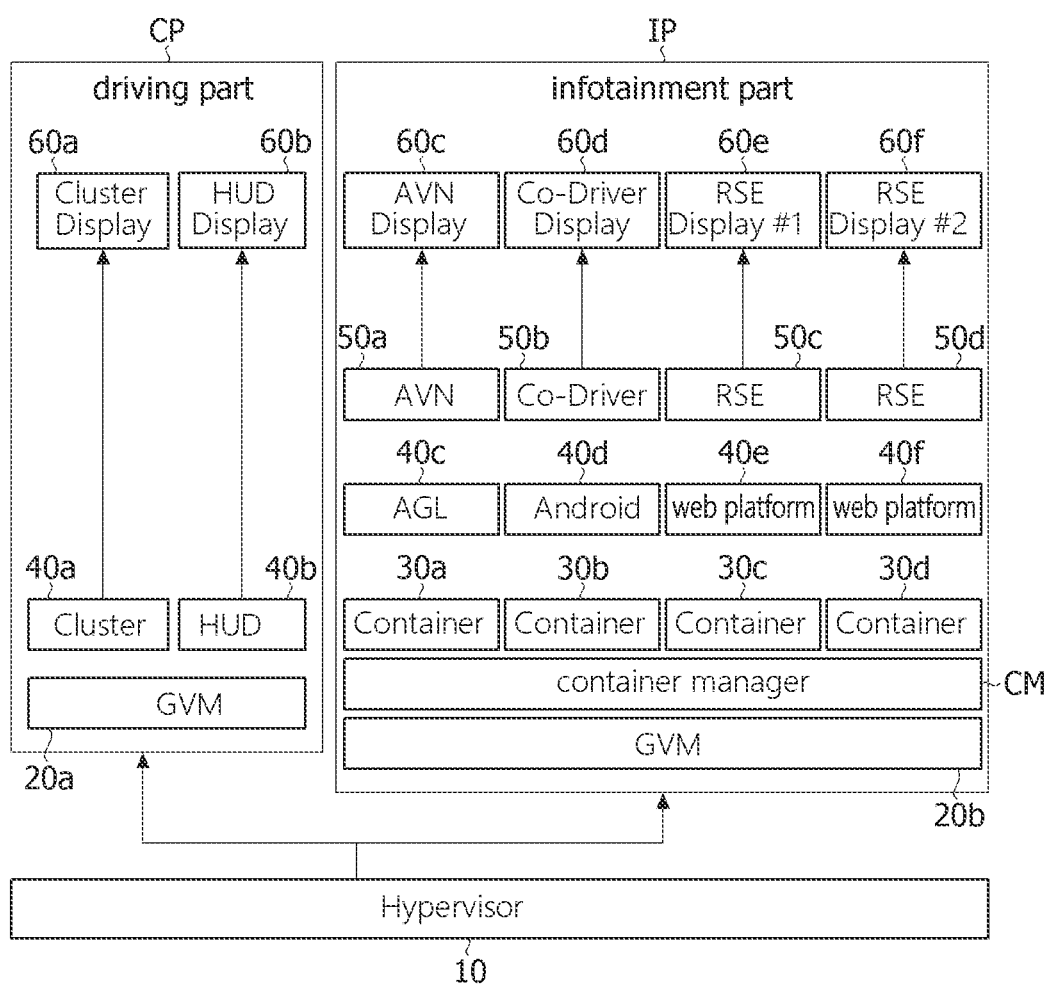
FIG. 1 is a conceptual diagram of a virtualized vehicle structure-based system according to an embodiment.

Various changes may be made to the present invention, and specific embodiments will be illustrated in the drawings and described in detail. However, such an embodiment is not intended to limit the invention and it should be understood that the embodiment include all changes, equivalents, and substitutes within the spirit and scope of the invention.

Terms including an ordinal number such as "second" and "first" can be used to describe various components without limiting the components. The terms are used only for distinguishing one component from another component. For example, a second component may be referred to as a first component and, similarly, the first component may be referred to as the second component, without departing from the scope of the present invention. The term and/or includes a combination of a plurality of related items enumerated or any of a plurality of related items enumerated.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, descriptions are made with reference to the accompanying drawings in which the same reference numbers are assigned to refer to the same or like components and redundant description thereof is omitted.

An embodiment of the present disclosure relates to an in-vehicle streaming control device and method for vehicle infotainment, and provides a system environment incorporating vehicle infotainment in using an application (in the same sense, 'app', 'application' and etc.) in a vehicle. However, this content does not limit the rights of this patent.

In detail, a vehicle system may provide vehicle infotainment functions and simultaneously perform important functions related to controlling the vehicle. Here, the functions related to controlling the vehicle includes applications that affect the user's vehicle operation, such as navigation systems, as well as cluster systems that display information such as vehicle speed and RPM and critical functions related to passenger safety, such as autonomous driving systems in autonomous vehicles. Moreover, the display of such applications should be flexible but should not interfere with driving, including vehicle control. That is, it is essential to ensure the protection of vehicle driving. Without such protection, accidents can occur. Therefore, in a preferred embodiment of the present invention, streaming is performed within the scope that does not interfere with driving, enabling easy access and operation of entertainment-related services and applications such as audio playback, video playback, and game execution for vehicle occupants including the driver.

Figure 2:
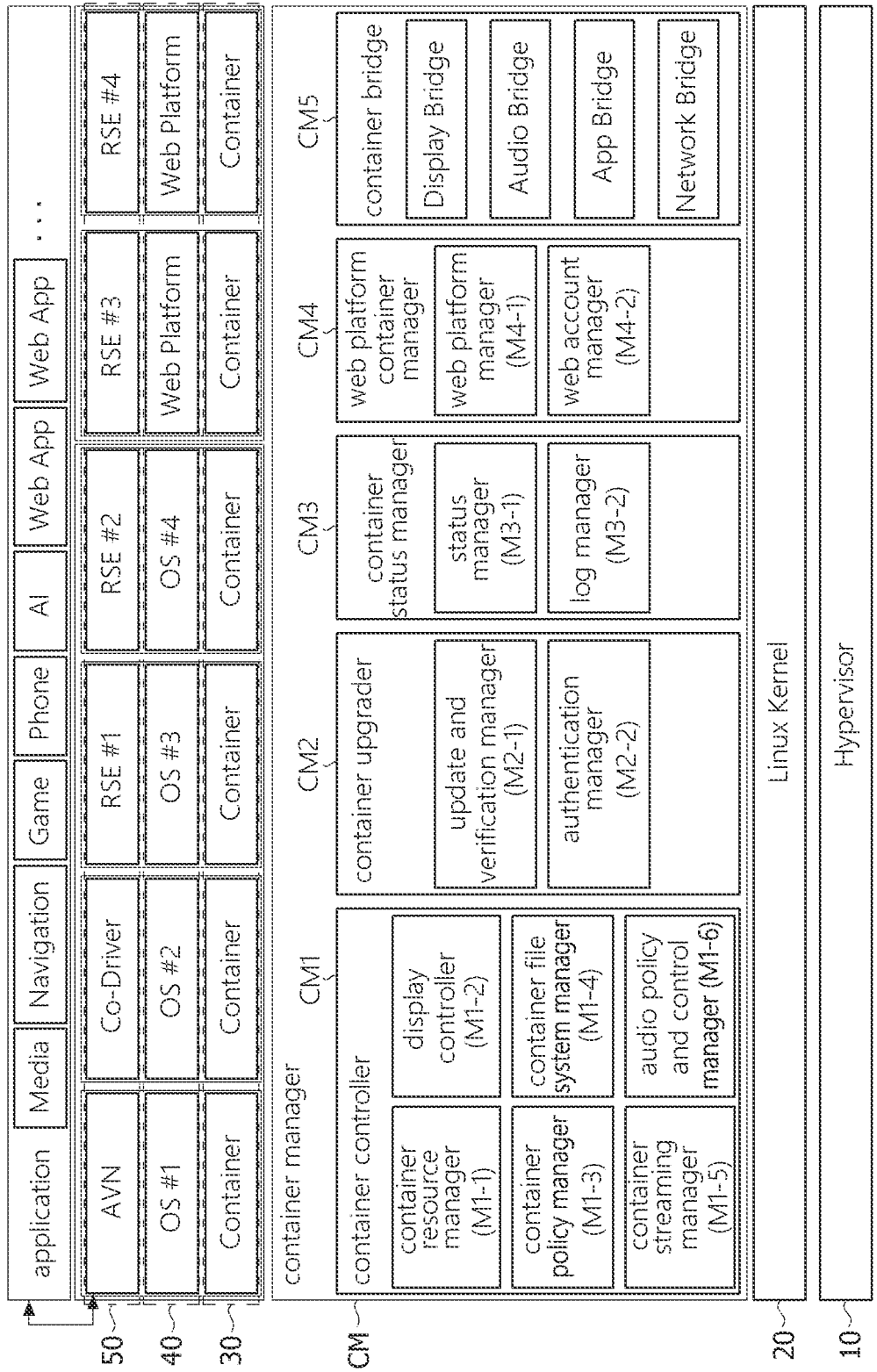
FIG. 2 is a detailed block diagram of a virtualized vehicle structure-based system according to an embodiment.

FIG. 1 is a conceptual diagram of a virtualized vehicle structure-based system according to an embodiment, and FIG. 2 is a detailed block diagram of a virtualized vehicle structure-based system according to an embodiment.

With reference to FIGS. 1 and 2, the system based on the virtualized vehicle structure according to the embodiment may include hardware (not shown), a base operating system 10 installed on the hardware (not shown), a first virtual engine 20a and a second virtual engine 20b installed on the base operating system 10, at least one operating system 30a to 30f installed on each virtual engine, a plurality of operating system platforms 40a to 40f installed on the at least one operating system 30a to 30f as software collections including middleware and important applications, a plurality of applications 50a to 50d operated on the operating system platforms 40a to 40f, a plurality of displays 60a to 60f that display a plurality of operating system platforms 40a to 40f or a plurality of applications, and a container manager CM that manages the environment of the plurality for operating systems 30a to 30d on the virtual engines 20a to 20b. The at least one operating system is described as a 'container' hereinbelow.

Here, the hardware (not shown) may be a concept that includes a processor, a display unit, a storage unit, a memory unit, a control unit, and I/O devices.

In an embodiment, the driving part CP may be a system area loaded or operated on the first virtual engine 20a, and the infotainment part (IP, Infotainment Platform) may be a system area loaded or operated on the first virtual engine 20a and the second virtual engine 20b as a heterogeneous virtual engine. With this configuration, even though upgrades or other malfunctions occur within the infotainment platform IP, the driving part CP may not be affected by them. That is, it is possible minimize the impact during driving. Furthermore, the web platform part (Web Platform) may be loaded or operated on the base operating system 10 and additional virtual engines 20 in addition to the infotainment part IP. Like the infotainment part IP, the platform part (Web platform) may also share the container manager with the infotainment part IP. Alternatively, the platform part (Web Platform) may be configured as part of the Infotainment part IP. Hereinafter, descriptions are made of individual components.

The platform part (Web Platform) may include a single operating system (e.g., containers 30) that is loaded on the container manager, such as the Infotainment Platform, a plurality of operating system platforms (e.g., AGL 40) that are a software collection including middleware and critical applications loaded on the operating system, and a plurality of applications (e.g., web applications 50) that run on the operating system platforms 40.

First, the base operating system 10, for example, may be various operation systems. For example, the base operating system 10 may include Linux, hypervisor, QNX, GENIVI, and the like.

For example, the first virtual engine 20a and the second virtual engine 20b may be developed in the mobile C language as middleware solutions or various platforms. The first virtual engine 20a and the second virtual engine 20b may provide a plurality of built-in libraries and may perform the same functions on various mobile terminals. For example, the first virtual engine 20a and the second virtual engine 20b may be an android kernel based on Linux and my initialize memory protection, virtual memory module, and schedule caching.

In addition, the at least one container 30a to 30d may be loaded on the second virtual engine 20a but not on the first virtual engine 10a. As a result, the security of the driving part CP may be improved, leading to an improvement in driving stability.

The at least one container 30a to 30d may be implemented as a form of virtualization, for example, process virtualization. For example, virtualization technology using containers may refer to a technique that distinguishes between the kernel space for managing physical resources and the user space for running user processes, i.e., application programs (applications, APPs), within the host operating system (OS), and divides the user space into multiple ones to allocate and share hardware resources used in each user process. For example, the containers 30a to 30d may perform connection or compatibility between the base operating system and the plurality of operating system platforms by converting invoked libraries to interface with system libraries.

The plurality of operating system platform 40a to 40f may be installed on the containers. The plurality of operating system platform 40a to 40f may include Android, Automotive Grade Linux (AGL), web platforms, cluster platforms, and head-up display (HUD) platforms.

The at least one application 50a to 50d may include application programs such as Audio Video Navigation (AVN), Co-Driver, and Rear Seat Entertainment (RSE) except for system programs.

The plurality of displays 60a to 60f may display the application programs running on the operating system platforms 40a to 40f or platforms to users (e.g., occupants). For example, the plurality of displays 60a to 60f may include various display devices (e.g., OLED).

The container manager CM may manage the environment for the plurality of operating systems 30a to 30d on the virtual engine 20a to 20b. That is, the container manager CM may perform resource allocation, streaming connection and update, display output control, and connection to output units for the plurality operating systems 30a to 30d, e.g., the containers. Detailed description thereof is made later.

In detail, the container manager CM may include a container controller CM1, a container upgrader CM2, a container state manager CM3, a web platform container manager CM4, and a container bridge CM5.

The container controller CM1 may perform management of system resources allocated to the containers, resource policies, streaming control, display output, and file system.

The container controller CM1 may include a container resource manager M1-1, a display controller M1-2, a container policy manager M1-3, a container file system manager M1-4, a container streaming manager M1-5, and an audio policy and control manager M1-6.

The container resource manager M1-1 may dynamically allocate system resources to the containers. For example, the container resource manager M1-1 may collect resource usage amount information to prevent QoS performance degradation caused by resource shortage. For example, the container resource manager M1-1 may configure the containers to be allocated to dedicated cores using priorities of predetermined containers, resource usage threshold values, and monitoring intervals.

The container policy manager M1-3 may include information on the priorities of the containers to be allocated to the dedicated cores.

The display controller M1-2 may manage the containers responsible for the operations of the plurality of displays to output screens to the respective displays inside the vehicle.

The container file system manager M1-4 may systematically and efficiently manage the files required for the operation of each container in multiple container environments. For example, the container file system manager M1-4 can overlay the file system of a container onto another container's file system, as described below. Thus, users (a plurality of passengers) may easily share file systems, such as containers, with other users or different locations (such as seats), enabling convenient sharing of resources.

That is, in a virtualized vehicle structure-based system according to an embodiment, multiple containers may share system initialization and management. For example, in a system based on a virtualized vehicle structure according to an embodiment, a plurality of containers may share a rootfs. In addition, each operating system, i.e., container, may store or copy its own separate modification directory to enable efficient utilization of resources such as disks. Furthermore, upgrades for each container may also be performed using only the modification directory. For example, each display device may be efficiently upgraded.

The container streaming manager M1-5 may manage the movement of images output on each display. That is, the container streaming manager M1-5 may determine the possibility of streaming based on the policies of each display, as well as the driving part and the infotainment part.

The audio policy and control manager M1-6 may control audio output based on the policy for audio output between at least one container. Detailed description thereof is made later.

The container upgrader CM2 may perform upgrades for each operating system in the infotainment part composed of the plurality of operating systems. For example, the container upgrader CM2 may easily upgrade each container in the infotainment part composed of the containers.

The container upgrader CM2 may include an update and verification manager M2-1 and an authentication manager M2-2.

The update and verification manager M2-1 may identify and update per container among the plurality of containers and verify normal operation after the update.

The authentication manager M2-2 may perform vehicle-specific and container-specific authentication and version comparison for updates.

The container state manager CM3 may manage the states of the plurality of containers, such as checking the normal operation of containers.

The container state manager CM3 may include a state manager M3-1 and a log manager M3-2.

The state manager M3-1 may check whether the containers and the container manager are operating normally through periodic monitoring.

The log manager M3-2 may store the contents confirmed through the container state manager in logs. In addition, the log manager M3-2 may delete or back up logs after a predetermined period of time. Furthermore, when a container operates abnormally, the state manager M3-1 may easily resolve the problem through the log manager M3-2.

The web platform container manager CM4 may perform management for the web platform containers and may include a web platform manager M4-1 and a web account manager M4-2.

The web platform manager M4-1 may manage various functions of the web platform to ensure that they are operating normally on the operating system, i.e., the container. In addition, when a plurality of web platform containers are running, the web platform manager M4-1 may manage personalized web usage environments based on per-container login accounts. Detailed description thereof is made later.

In addition, the container bridge manager CM5 may be connected to interfaces, hardware, and the like to perform the mutual connection between each operating system for display, audio, application, network, etc.

Each component illustrated in the diagrams is an example, and a description will be made on the basis thereof hereinafter.

In addition, users (e.g., occupants) may operate a virtualized vehicle structure-based system through user interfaces and the like. In addition, the process of operation or the results thereof may be provided to the user through output devices such as displays and audio. In addition, feedback may be provided for user input such as touch gestures on the display and the like.

Figure 3:
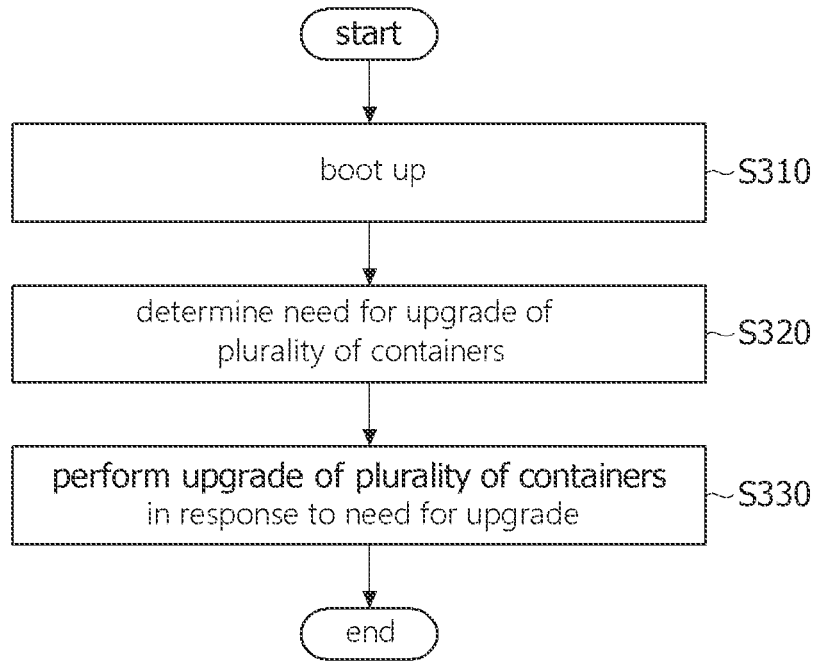
FIG. 3 is a flowchart illustrating a method for controlling a virtualized vehicle structure-based system according to an embodiment.
Figure 4:
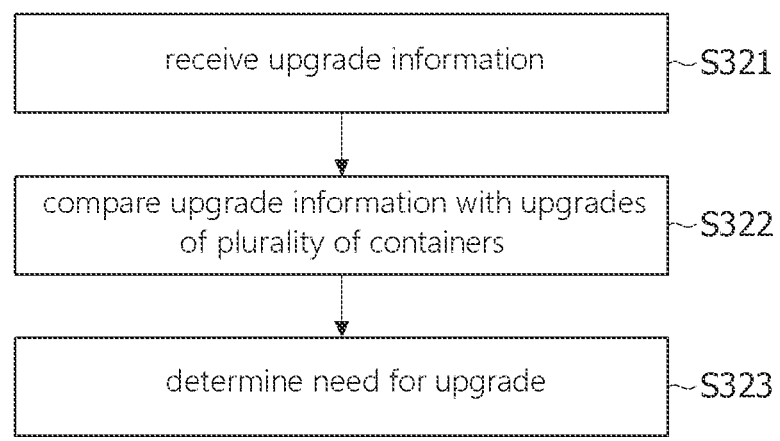
FIG. 4 is a detailed flowchart of checking necessity of an upgrade in a method for controlling a virtualized vehicle structure-based system according to an embodiment.
Figure 5:
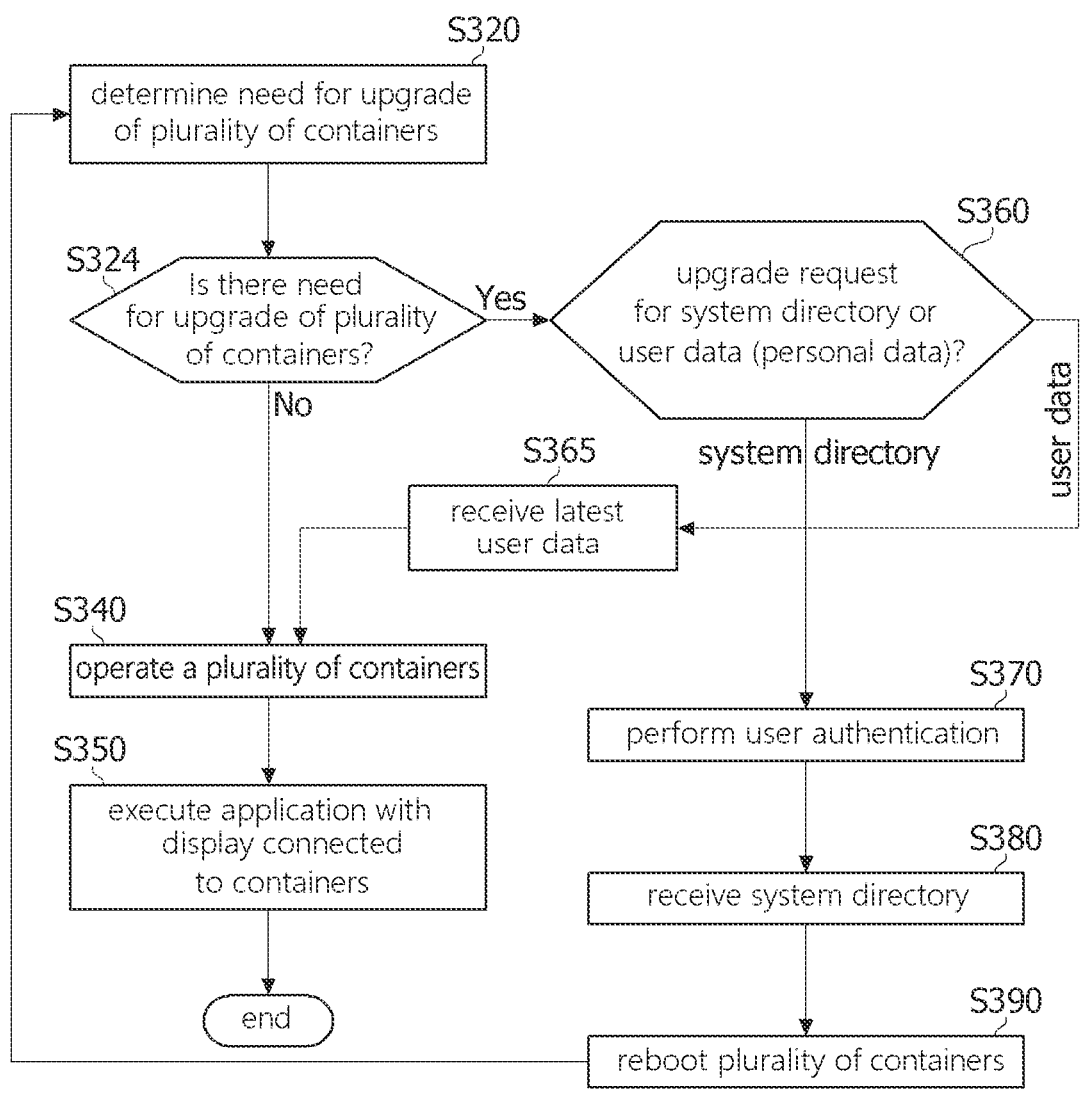
FIG. 5 is a detailed flowchart of a method for controlling a virtualized vehicle structure-based system according to an embodiment.
Figure 6:
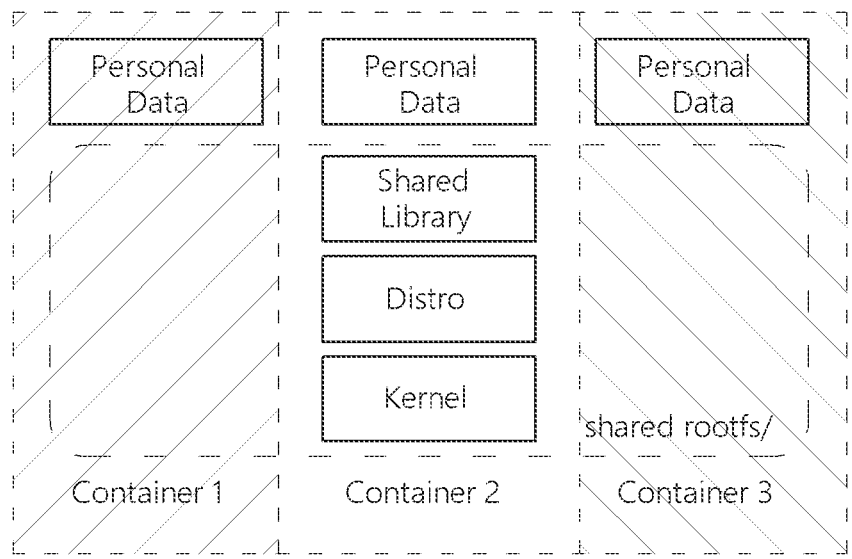
FIG. 6 is a conceptual diagram of a structure of a plurality of containers in a virtualized vehicle structure-based system according to an embodiment.
Figure 7:
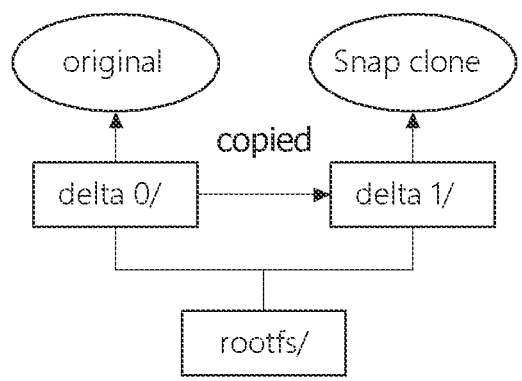
FIGS. 7 and 8 are diagrams illustrating operations of a plurality of containers in a virtualized vehicle structure-based system according to an embodiment.
Figure 8:
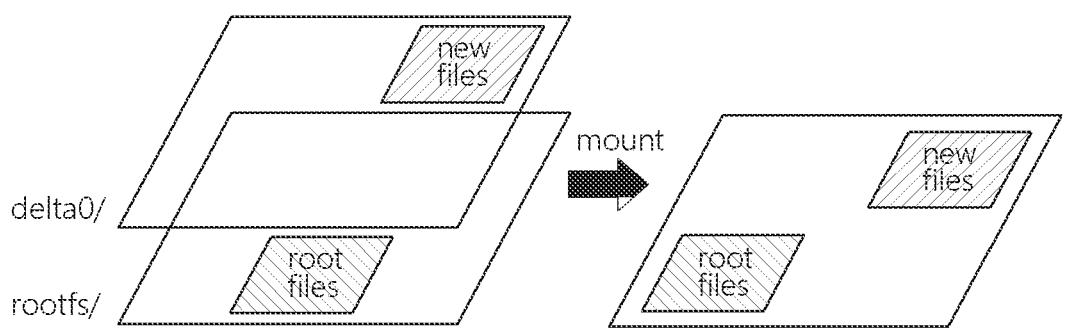

FIG. 3 is a flowchart illustrating a method for controlling a virtualized vehicle structure-based system according to an embodiment, FIG. 4 is a detailed flowchart of checking necessity of an upgrade in a method for controlling a virtualized vehicle structure-based system according to an embodiment, FIG. 5 is a detailed flowchart of a method for controlling a virtualized vehicle structure-based system according to an embodiment, FIG. 6 is a conceptual diagram of a structure of a plurality of containers in a virtualized vehicle structure-based system according to an embodiment, and FIGS. 7 and 8 are diagrams illustrating operations of a plurality of containers in a virtualized vehicle structure-based system according to an embodiment.

A method for controlling a virtualized vehicle structure-based system according to an embodiment may include booting up a plurality of containers at step S310, determining at step S320 the need for upgrading a plurality of containers, and performing at step S330 upgrades on the plurality of containers in response to the need for upgrading.

Here, in the a virtualized vehicle structure-based system according to the embodiment, a plurality of containers may share system initialization and management as described above.

For example, a plurality of containers (Container 1 to Container 3) may share the rootfs, which is the shared system initialization and management. That is, the plurality of containers (Container 1 to Container 3) may share the kernel, distro, and libraries.

Here, the method for controlling a virtualized vehicle structure-based system may be executed in the container manager CM. That is, the apparatus for controlling a virtualized vehicle structure-based system may include the container manager CM. In addition, the apparatus for controlling the virtualized vehicle structure-based system may include the container controller CM1 and the container upgrader CM2 and may perform each of the control steps described below. Hereinafter, a brief description is made of the device where each step is performed.

In an embodiment, the container controller may boot up a plurality of containers at step S310. Next, the container upgrader CM2 may determine, at step S320, the need for upgrades of the operating systems, i.e., the booted plurality of containers.

In detail, determining whether there is the need for upgrades of the plurality of containers may include receiving upgrade information at step S321, comparing the upgrade information with the upgrades of the plurality of containers at step S322, and determining the need for an upgrade at step S323.

The container upgrader CM2 may receive update information from a server, etc. The update information may include information on the version of the corresponding container.

In addition, the container manager CM or container upgrader CM2 may compare the received upgrade information with the upgrades, i.e., the upgrade information of the plurality of containers. Thus, it is possible to determine whether the upgrade information of the containers is not up-to-date compared to the received upgrade information by comparing the upgrade information of the corresponding containers with the received upgrade information.

For example, the container manager CM or container upgrader CM2 may determine that there is no need for an upgrade when the received upgrade information is the same version as the upgrade information of the container or when the upgrade information of the container is the latest. In addition, it may be determined that an upgrade is necessary when the received upgrade information is of a lower version than the upgrade information of the container. That is, it is possible to determine at step S334 whether there is a need for an upgrade of the plurality of containers.

Next, the container manager CM may perform at step S330 upgrades for the plurality of containers in response to the determination of the need for an upgrade. The container manager CM may perform upgrades for the plurality of containers only when there is a need for upgrades. Next, when there is no need for an upgrade, the container controller CM1 may start the plurality of containers at step S340. That is, the container may be started by loading per-display user data (personal data). Here, as described above, the container manager CM or container controller CM1 may control the per-display containers to share the system initialization and management rootfs in the vehicle in order for each container (e.g., per display) overlays user data on the shared rootfs, resulting in saving disk resources. As a result, efficient container operation or startup can be achieved. Furthermore, the container can be started by copying user data. In an embodiment, a plurality of containers can be started or executed by copying the changed directory from the user data. That is, the latest version of user data (delta0/) may be copied to a new user data (delta1/) for the container operation or execution. Therefore, it may become easy to operate a new container (snap clone) after the operation of the original container. For example, containers for a plurality of RSE displays may be more easily operated. In addition, as described above, the existing up-to-date user data or newly operated user data (new files) may be overlaid (mounted) on the shared rootfs (root files). As a result, both the operation and update of the container (system files and user data) can be made more conveniently.

Next, the container manager CM or container controller CM1 may execute at step S350 applications on the display associated with the containers. Accordingly, per-occupant services (e.g., application execution) may be provided through per-occupant displays for occupants in the vehicle.

Next, when there is a need for upgrade, the container manager CM or container controller CM1 may determine at step S360 whether the upgrade is needed for the system directory or for user data (personal data). This may be a realization of step S330 of performing upgrades for multiple containers in response to the need for upgrade. That is, the operation of upgrades for the containers may be implemented as follows.

When it is determined as an upgrade for the system directory at step S360, the container manager CM may perform user authentication at step S370 and receive the system directory a step S380.

The container manager CM or the container upgrader CM2 may perform user authentication. The user authentication may include authentication for the vehicle and the container. That is, after determining the type of the vehicle and the type of the container, the authentication for the container corresponding to the vehicle may be performed at step S370.

The container manager CM or the container upgrader CM2 may also receive the latest version of the file system from the server. For example, the file system may include a kernel, an OS, and libraries. The received file system may be applied to the shared rootfs. That is, a virtualized vehicle structure-based control method and apparatus according to an embodiment may facilitate the system directory upgrade for the same container type on the same virtual engine via the container manager (or including the container manager). That is, system directory upgrades for a plurality of containers can be performed by receiving the system directory one time. Next, the plurality of containers may be rebooted at step S390.

Afterward, the procedure may return to the step S320 of determining the need for upgrade to perform the above-described steps or functions.

When it is determined as an upgrade for the user data (personal data) at step S360, a plurality of containers may be started at step S340. However, it may precede to receive the latest user data at step S365. Here, the latest one means either the one that is higher in preservation or the one with the closest modified date.

The latest user data may be applied to each container. Here, as described above, it is possible to load the user data by overlaying it onto the shared rootfs and run the individual containers. As a result, it is possible to minimize the usage of disk resources.

Next, the container manager CM may execute the applications at step S350 on the displays associated with the containers. That is, the applications may run on the respective containers and be displayed through the respective display. Accordingly, per-occupant services (e.g., application execution) may be provided through per-occupant displays for occupants in the vehicle.

Figure 9:
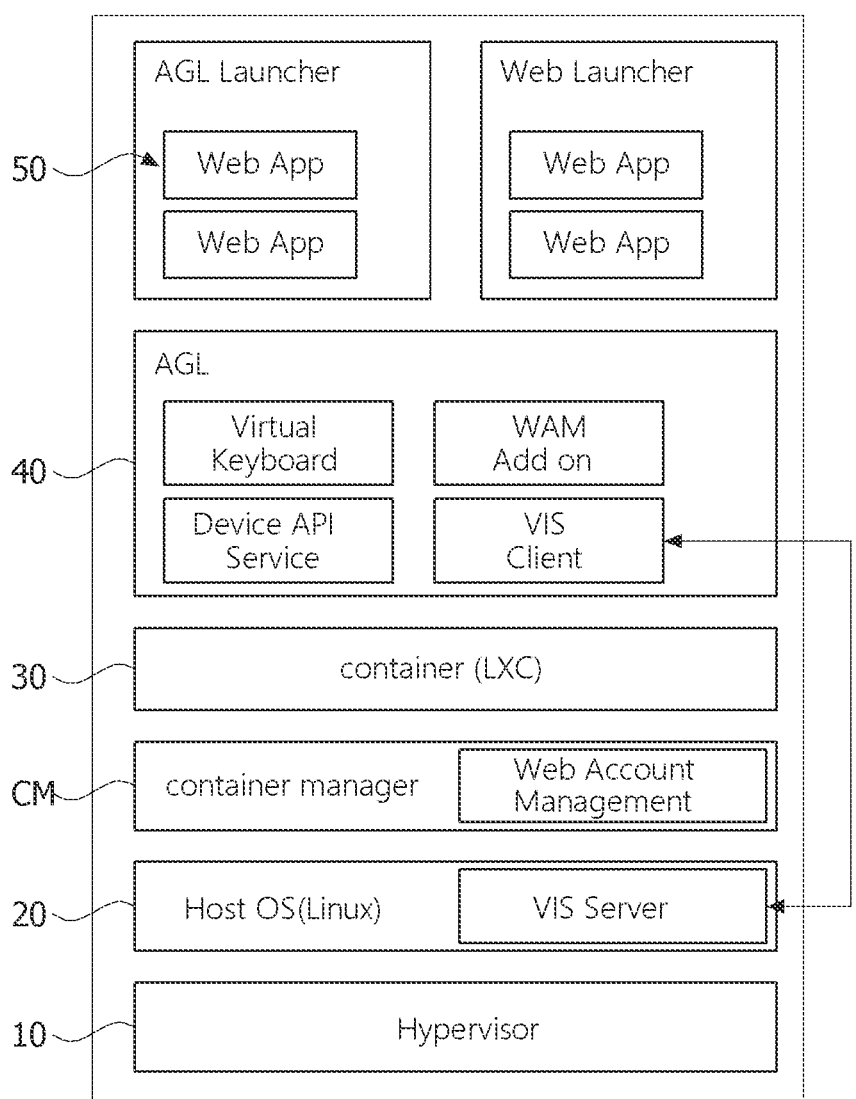
FIG. 9 is an enlarged view of area K of FIG. 2.
Figure 10:
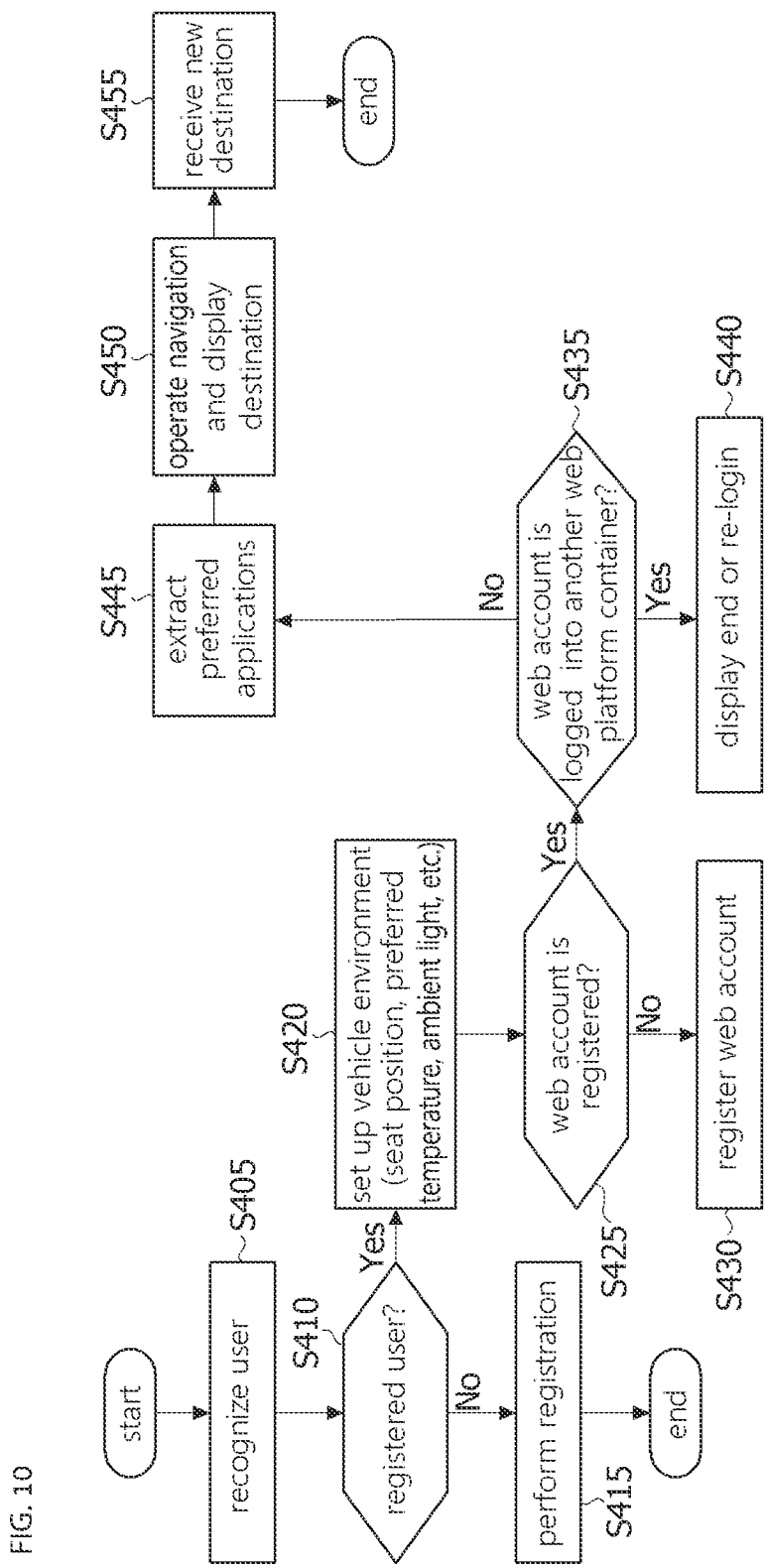
FIG. 10 is a flowchart illustrating a method for controlling a web platform in a virtualized vehicle structure-based system according to an embodiment.
Figure 11:
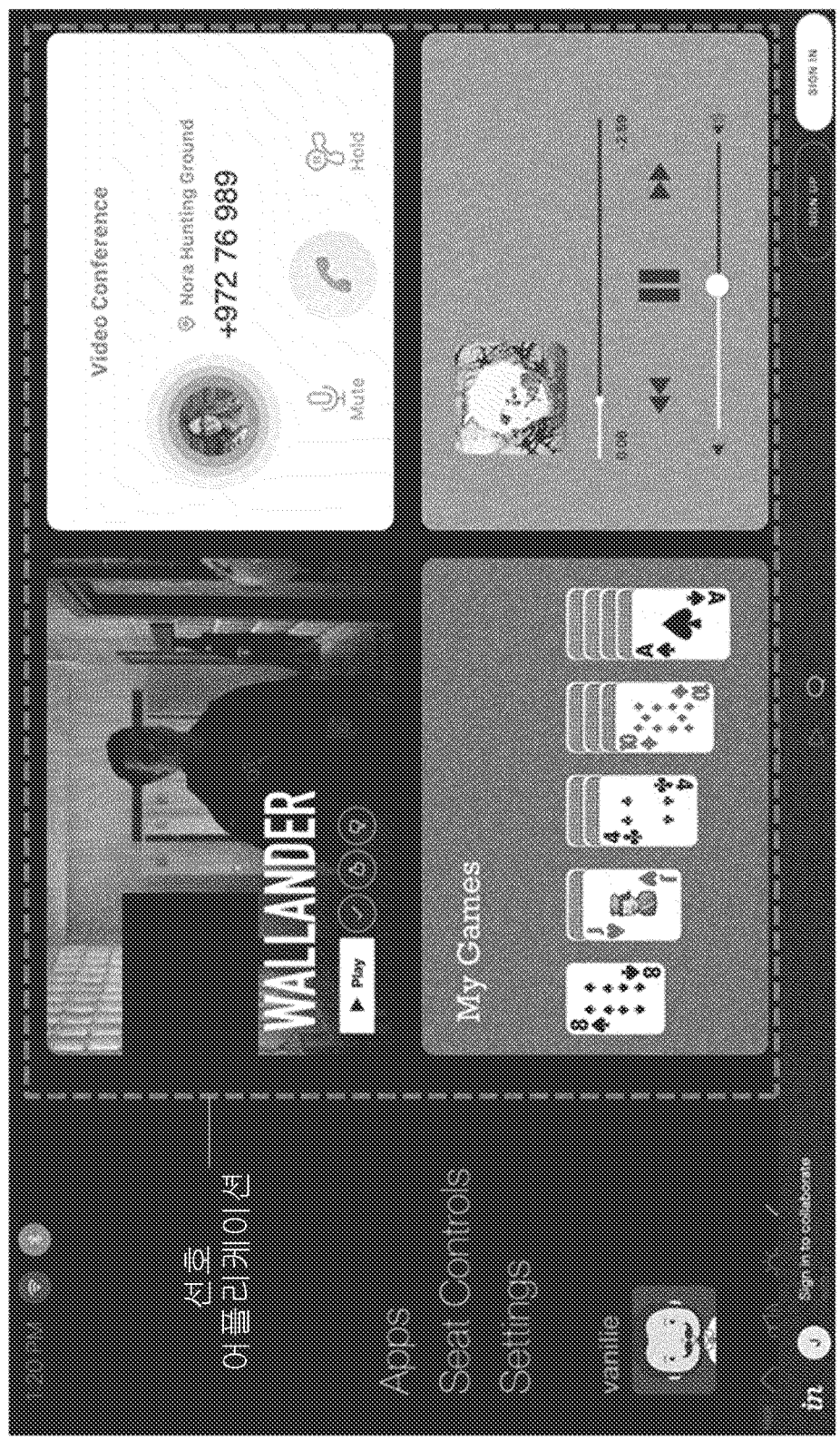
FIG. 11 is a diagram illustrating driving of a web application in a method for controlling a web platform in a virtualized vehicle structure-based system according to an embodiment.

FIG. 9 is an enlarged view of part K of FIG. 2, FIG. 10 is a flowchart illustrating a method for controlling a web platform in a virtualized vehicle structure-based system according to an embodiment, and FIG. 11 is a diagram illustrating driving of a web application in a method for controlling a web platform in a virtualized vehicle structure-based system according to an embodiment.

With reference to FIGS. 9 to 11, a virtualized vehicle structure-based system according to an embodiment may include the web platform part (Web Platform) loaded or operated on the base operating system 10 and additional virtual engines 20. Like the infotainment part IP, the platform part (Web platform) may also share the container manager with the infotainment part IP. Alternatively, the platform part (Web Platform) may be configured as part of the Infotainment part IP. A description thereof is made as an individual configuration as aforementioned.

In addition, the platform part (Web Platform) may include a single operating system (e.g., containers 30) that is loaded on the container manager, such as the Infotainment Platform, a plurality of operating system platforms (e.g., AGL 40) that are a software collection including middleware and critical applications loaded on the operating system, and a plurality of applications (e.g., web applications 50) that run on the operating system platforms 40.

Furthermore, the virtual engine 20 may include a Vehicle Information Service Server (VIS server) that provides vehicle information services. The Vehicle Information Service Server (VIS server) may store vehicle driving unit information (speed, fuel level, etc.) and vehicle setting information (temperature, seat position, etc.) and send the information to each web platform container, i.e., the operating system platform 40. That is, the Vehicle Information Service Server (VIS server) may provide vehicle driving unit information and vehicle setting information requested or matching the occupant to the Vehicle Information Service Client (VIS client) within each web operating system platform 40.

In addition, as described above, the container manager CM may include a web platform container manager CM4. In addition, the web platform container manager CM4 may perform management for the web platform containers and may include a web platform manager and a web account manager.

The web platform manager may manage various functions of the web platform to ensure that they are operating normally on the operating system, i.e., the container. In addition, when a plurality of web platform containers are running, the web platform manager may manage personalized web usage environments based on per-container login accounts.

The operating system platform 40, via AGL, may include a service client (Vehicle Information Service Sever, VIS Client) that receives vehicle driving unit information and vehicle setting information requested or corresponding to the occupant and sets the vehicle environment.

Furthermore, the operating system platform 40 may include a device API service for user recognition and registration, an add-on (WAM add on) that monitors and manages whether a plurality of web applications can use hardware resources such as GPS when a plurality of web platform containers (operating systems 30) are operated to extend the functionality of managing the web applications included in the operating system platforms, and a virtual keyboard (Virtual Keyboard) for text input when using web applications.

In more detail, the virtualized vehicle structure-based control method according to an embodiment may include recognizing, a step S405, a user in relation to web platform control and verifying, at step S410, whether the recognized user is a registered user.

That is, the operating system platform 40 or API service (Device API service) may recognize users at step S405. That is, user recognition may be performed for each occupant inside the vehicle. This means that user recognition may be performed through various devices such as sensors, mobile devices, applications, and so on. Recognizing users at step S405 may be carried out after updating and operating the containers as described above. For example, recognizing users at step S405 may be performed after the application is running on each container and displayed on each display at step S350. Here, the user recognition may be performed after the user got in the vehicle operates the web platform container.

The operating system platform 40 or the API service (Device API service) may determine at step S410 whether the recognized user is a registered user. The operating system platform 40 or the API service (Device API service) may perform, when the recognized user is not a registered user, user registration at S415 and set up, when the recognized user is already a registered user, the vehicle environment at step S420. The vehicle environment may include seat position, preferred temperature, lighting conditions, and so on.

In particular, user recognition may be carried out in conjunction with the container manager CM and the web platform container manager CM4. The web platform container manager CM4 may manage web account registration, modification, and deletion, determine whether a web account is a registered account, execute and manage an application list per web account, and manage the login status to prevent duplicate login of the web account. That is, the container manager CM may verify the user information provided by the operating system platform 40 or the API service (Device API service) and execute and manage per-account application lists and duplicate logins.

And the container manager CM, i.e., the web platform container manager CM4, may determine at step S425 whether the recognized user, i.e., the user information, has a registered web account.

Next, the container manager CM, i.e., the web platform container manager CM4, may register and store a web account at S430) when the web account for the user is not registered or does not exist, and may check at step S435 whether the web account has been logged in to another web platform container when the web account has been registered.

Next, the container manager CM, i.e., the web platform container manager CM4, may display at step S440 an end or re-login message when the web account is logged in to another web platform container, and may extract per-web account applications at step S445 when the web account is not logged in. Afterward, the extracted per-web account preferred applications may be provided to the user (refer to FIG. 11). Accordingly, the user may easily recognize the operation of the per-web account preferred or real-time web applications.

Next, the container manager CM, i.e., the web platform container manager CM4, may operate a navigation application and display the destination on the display at step S450. Next, the user may input the destination via a virtual keyboard at step S455. As such, the vehicle virtualization structure-based control method and apparatus according to an embodiment may facilitate the use of web platform applications via user recognition through web platform control (method or apparatus) and allow the same application to be operated with different user or occupant web accounts on each operating system (web platform container). Thus, the same application can be executed and operated with individual accounts of the occupants inside the vehicle.

Figure 12:
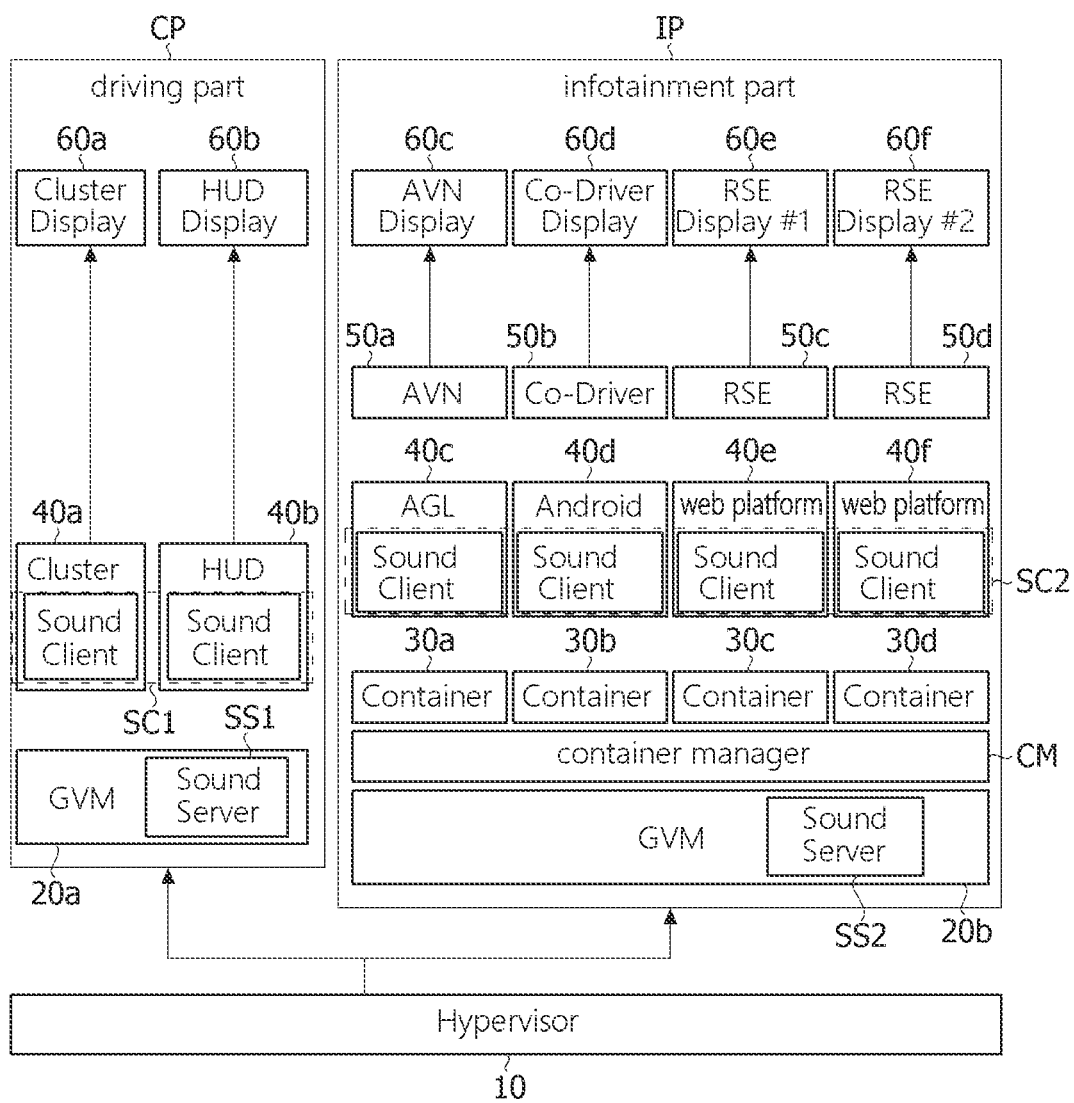
FIG. 12 is a conceptual diagram of a virtualized vehicle structure-based system according to another embodiment.
Figure 13:
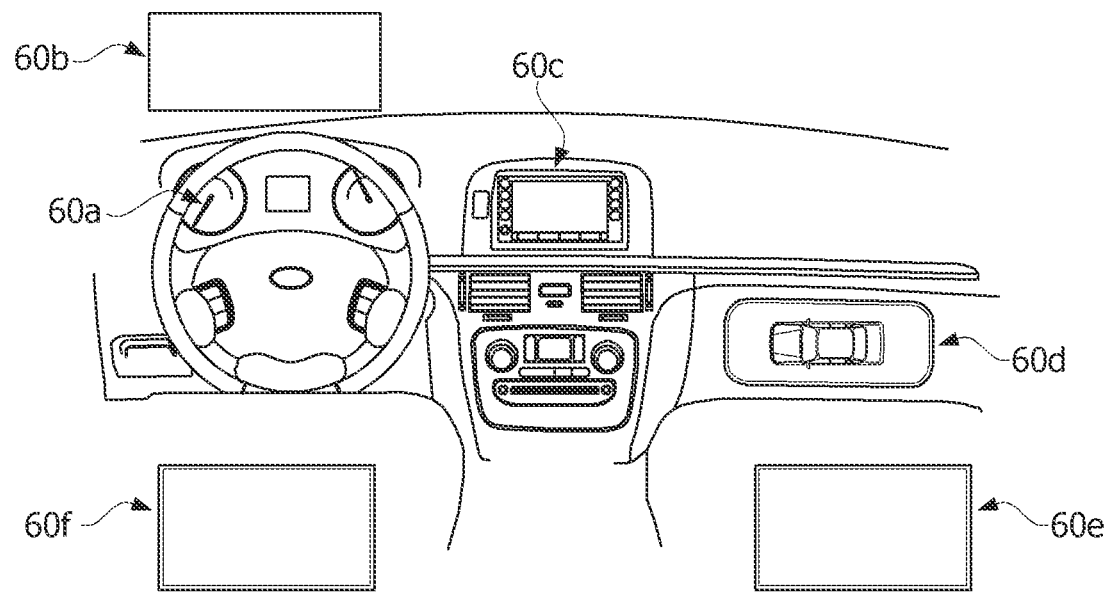
FIG. 13 is a diagram illustrating a display device in a virtualized vehicle structure-based system according to an embodiment.

FIG. 12 is a conceptual diagram of a virtualized vehicle structure-based system according to another embodiment, and FIG. 13 is a diagram illustrating a display device in a virtualized vehicle structure-based system according to an embodiment.

With reference to FIGS. 12 and 13, the virtualized vehicle structure-based system according to an embodiment may include hardware (not shown), a base operating system 10 installed on the hardware (not shown), a first virtual engine 20a and a second virtual engine 20b installed on the base operating system 10, at least one operating system 30a to 30f installed on each virtual engine, a plurality of operating system platforms 40a to 40f installed on the at least one operating system 30a to 30f as software collections including middleware and important applications, a plurality of applications 50a to 50d operated on the operating system platforms 40a to 40f, a plurality of displays 60a to 60f that display a plurality of operating system platforms 40a to 40f or a plurality of applications, and a container manager CM that manages the environment of the plurality for operating systems 30a to 30d on the virtual engines 20a to 20b. The at least one operating system is described as a 'container'.

Here, the hardware (not shown) may be a concept that includes a processor, a display unit, a storage unit, a memory unit, a control unit, and I/O devices.

In an embodiment, the driving part CP may be a system area loaded or operated on the first virtual engine 20a, and the infotainment part (IP, Infotainment Platform) may be a system area loaded or operated on the first virtual engine 20a and the second virtual engine 20b as a heterogeneous virtual engine. With this configuration, even though upgrades or other malfunctions occur within the infotainment platform IP, the driving part CP may not be affected by them. That is, it is possible minimize the impact during driving. Furthermore, the web platform part (Web Platform) may be loaded or operated on the base operating system 10 and additional virtual engines 20 in addition to the infotainment part IP. Like the infotainment part IP, the platform part (Web platform) may also share the container manager with the infotainment part IP. Alternatively, the platform part (Web Platform) may be configured as part of the Infotainment part IP. Hereinafter, descriptions are made of individual components.

The platform part (Web Platform) may include a single operating system (e.g., containers 30) that is loaded on the container manager, such as the Infotainment Platform, a plurality of operating system platforms (e.g., AGL 40) that are a software collection including middleware and critical applications loaded on the operating system, and a plurality of applications (e.g., web applications 50) that run on the operating system platforms 40.

First, the base operating system 10 may be various operation systems, for example. For example, the base operating system 10 may include Linux, hypervisor, QNX, GENIVI, and the like.

For example, the first virtual engine 20a and the second virtual engine 20b may be developed in the mobile C language as middleware solutions or various platforms. The first virtual engine 20a and the second virtual engine 20b may provide a plurality of built-in libraries and may perform the same functions on various mobile terminals. For example, the first virtual engine 20a and the second virtual engine 20b may be an android kernel based on Linux and my initialize memory protection, virtual memory module, and schedule caching.

In addition, the at least one container 30a to 30d may be loaded on the second virtual engine 20a but not on the first virtual engine 10a. As a result, the security of the driving part CP may be improved, leading to an improvement in driving stability.

The at least one container 30a to 30d may be implemented as a form of virtualization, for example, process virtualization. For example, virtualization technology using containers may refer to a technique that distinguishes between the kernel space for managing physical resources and the user space for running user processes, i.e., application programs (applications, APPs), within the host operating system (OS), and divides the user space into multiple ones to allocate and share hardware resources used in each user process. For example, the containers 30a to 30d may perform connection or compatibility between the base operating system and the plurality of operating system platforms by converting invoked libraries to interface with system libraries.

The plurality of operating system platform 40a to 40f may be installed on the containers. The plurality of operating system platform 40a to 40f may include Android, Automotive Grade Linux (AGL), web platforms, cluster platforms, and head-up display (HUD) platforms. In addition, a plurality of sound clients may be deployed within the operating system platform 40. The plurality of sound clients may include a first sound client and a second sound client. Here, the first sound client may be loaded on the operating system platform 40a and 40b of the first virtual engine 20a. The second sound client may be loaded on the operating system platform (40c or the like) of the second virtual engine 20b. That is, the first sound client and the second sound client may be loaded on different virtual engines. The first sound client may also be loaded on the cluster operating system 40a or the HUD operating system 40b. The second sound client may also be loaded on the audio video navigation (AVN) operating system, the Co-Driver operating system, and the Rear Seat Entertainment (RSE) operating system.

In addition, a sound server may receive the first sound output information and the second sound output information from the first sound client (SC1) and the second sound client (SC2), respectively. The sound server may be installed on the virtual engines 20a and 20b or within the base operating system 10. Hereinafter, the description is made on the basis that the sound server includes a first sound server SS1 and a second sound server SS2 that are loaded on heterogeneous virtual engines.

The at least one application 50a to 50d may include application programs such as Audio Video Navigation (AVN), Co-Driver, and Rear Seat Entertainment (RSE) except for system programs.

The plurality of displays 60a to 60f may display the application programs running on the operating system platforms 40a to 40f or platforms to users (e.g., occupants). For example, the plurality of displays 60a to 60f may include various display devices (e.g., OLED).

The following description may be related to the audio policy and control manager described above.

In addition, users (e.g., occupants) may operate a virtualized vehicle structure-based system through user interfaces and the like. In addition, the process of operation or the results thereof may be provided to the user through output devices such as displays and audio.

Figure 14:
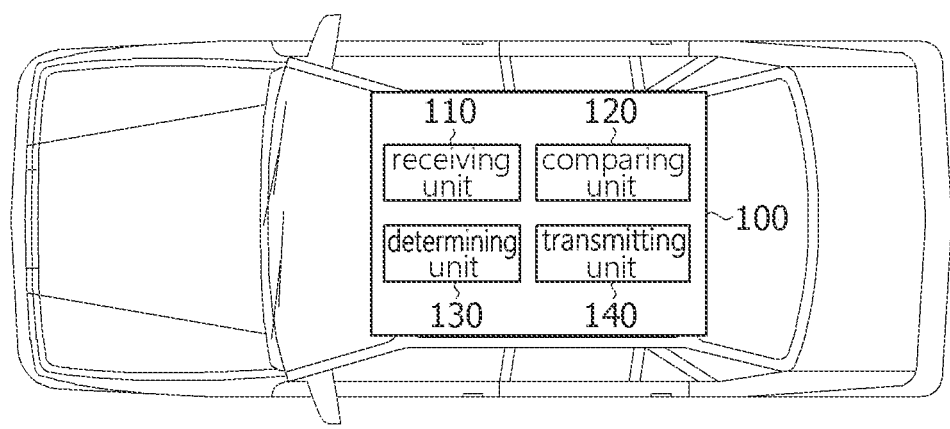
FIG. 14 is a block diagram of a sound control device based on a virtualized vehicle structure according to an embodiment.
Figure 15:
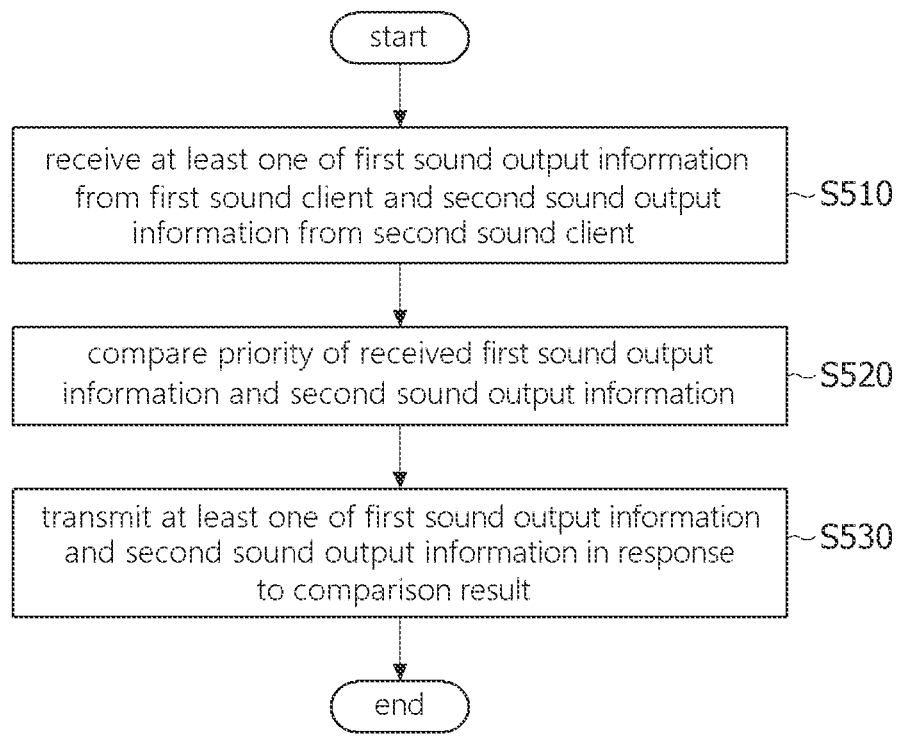
FIG. 15 is a flowchart of a sound control method based on a virtualized vehicle structure according to an embodiment.
Figure 16:
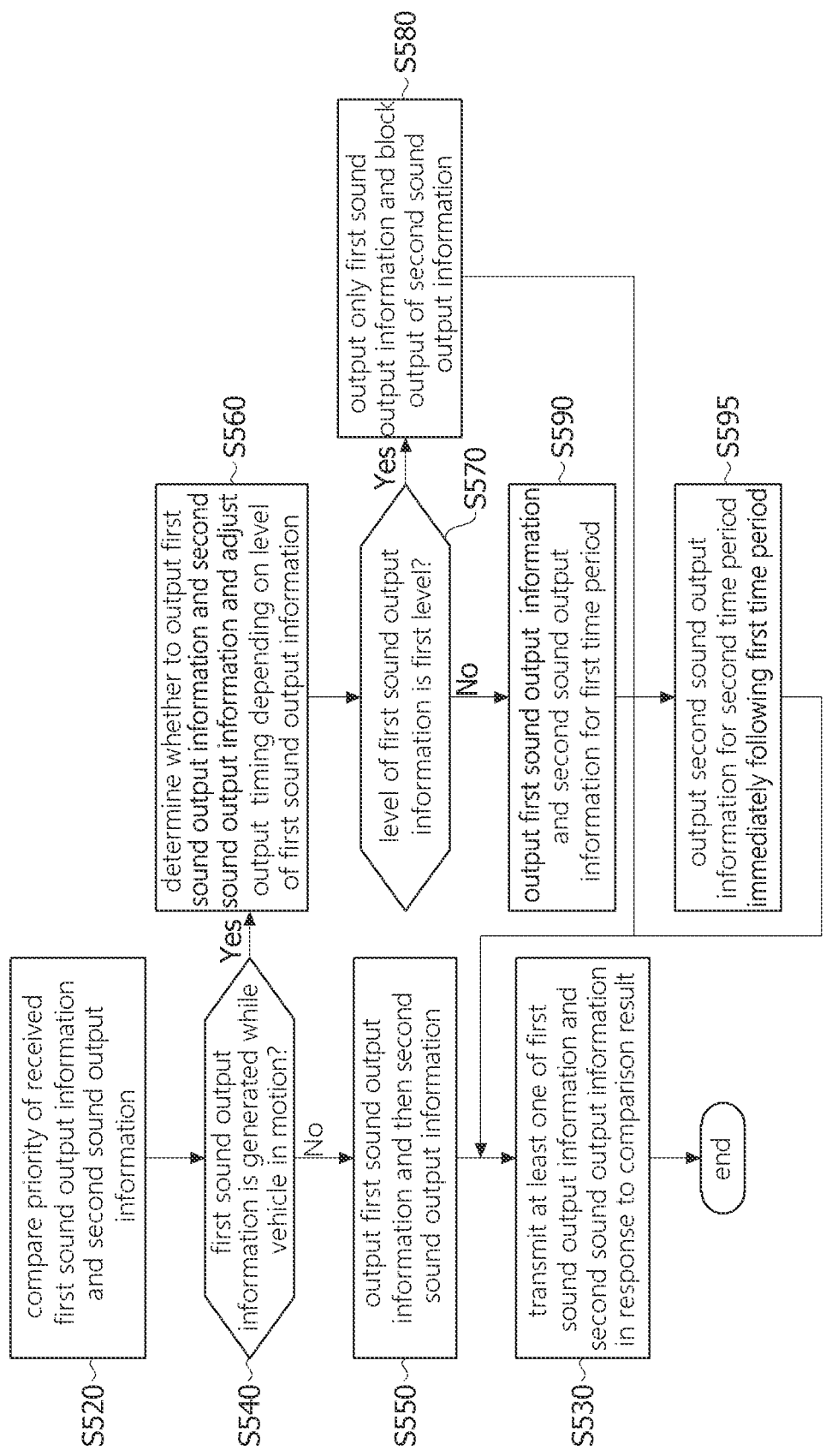
FIG. 16 is a detailed flowchart of a sound control method based on a virtualized vehicle structure according to an embodiment.
Figure 17:
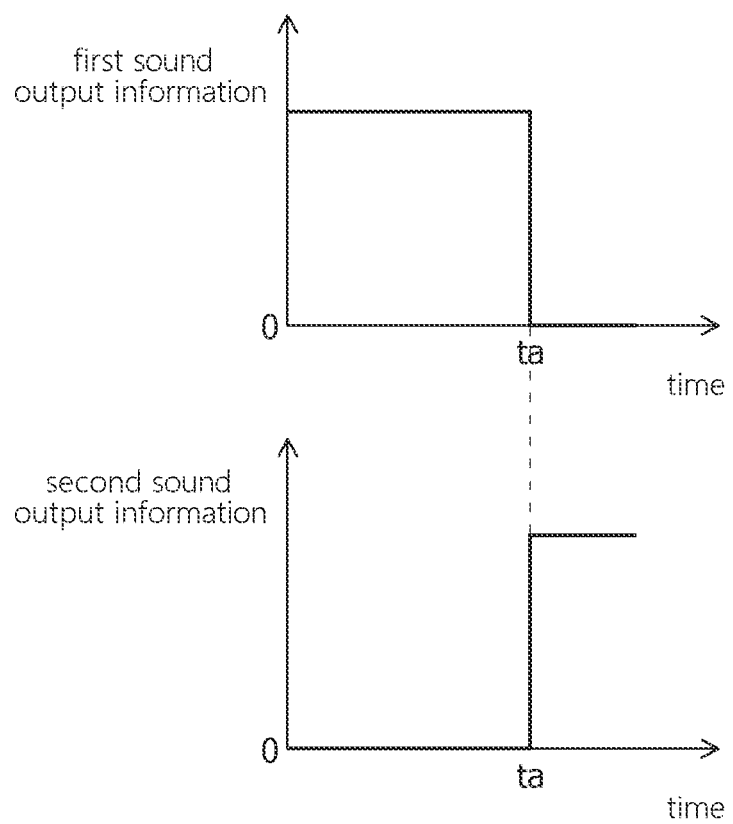
FIG. 17 is a diagram illustrating outputs of first sound output information and second sound output information according to an embodiment.
Figure 18:
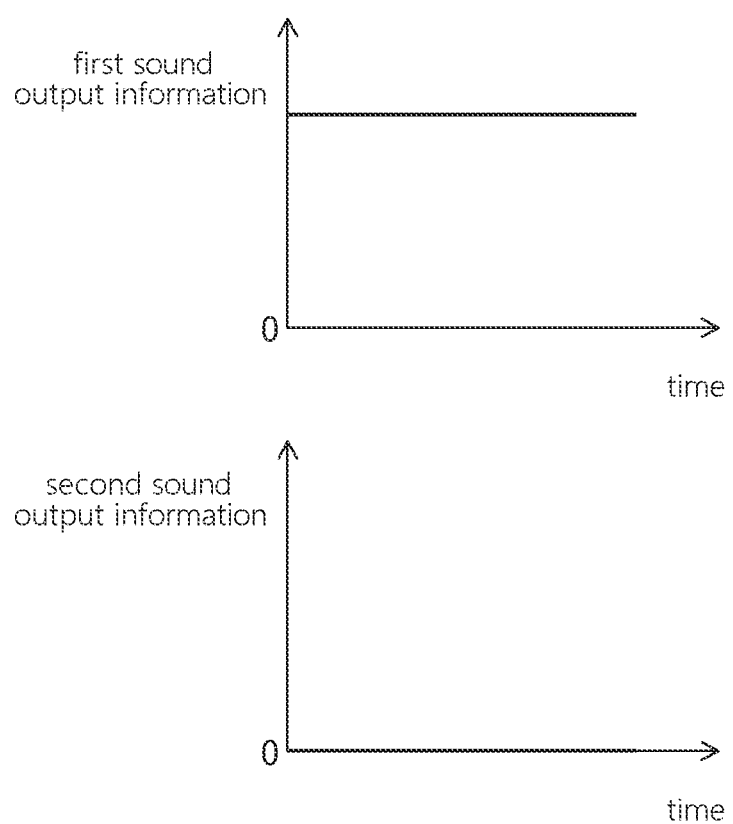
FIG. 18 is a diagram illustrating outputs of first sound output information and second sound output information according to another embodiment.
Figure 19:
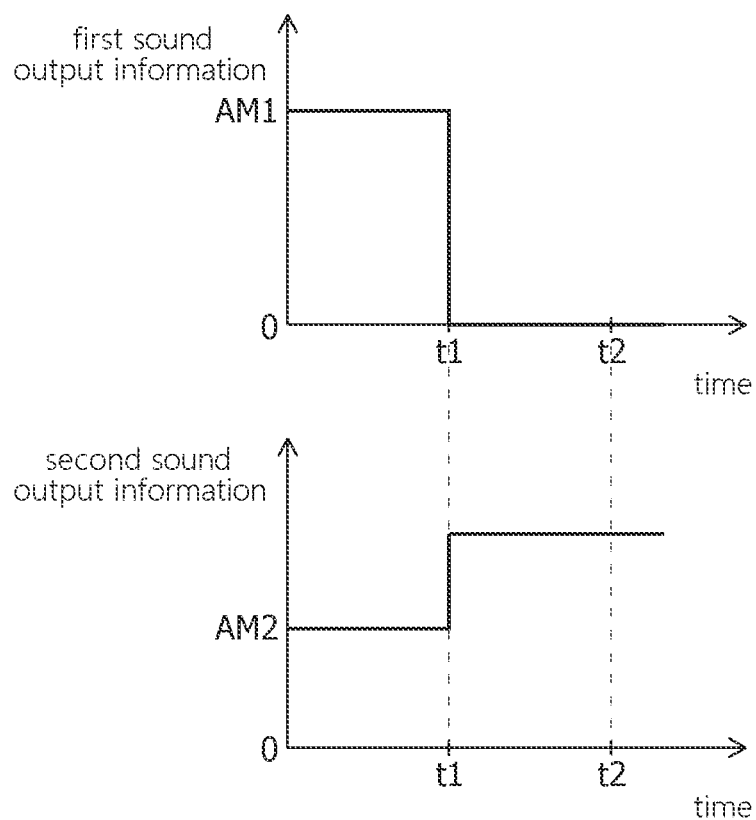
FIG. 19 is a diagram illustrating outputs of first sound output information and second sound output information according to still another embodiment.

FIG. 14 is a block diagram of a sound control device based on a virtualized vehicle structure according to an embodiment, FIG. 15 is a flowchart of a sound control method based on a virtualized vehicle structure according to an embodiment, FIG. 16 is a detailed flowchart of a sound control method based on a virtualized vehicle structure according to an embodiment, FIG. 17 is a diagram illustrating outputs of first sound output information and second sound output information according to an embodiment, FIG. 18 is a diagram illustrating outputs of first sound output information and second sound output information according to another embodiment, and FIG. 19 is a diagram illustrating outputs of first sound output information and second sound output information according to still another embodiment.

With reference to FIG. 14, the virtualized vehicle structure-based sound control apparatus 100 may include a receiving unit 110, a comparing unit 120, a determining unit 130, and a transmitting unit 140. Here, the virtualized vehicle structure-based sound control apparatus 100 includes an audio policy and control manager, and the audio policy and control manager may correspond to the receiving unit 110, comparing unit 120, determining unit 130, and transmitting unit 140.

First, the receiving unit 110 may receive sound output information from each sound client. For example, the receiving unit 110 may receive at least one of the first sound output information from the first sound client and the second sound output information from the second sound client. The sound output information may be generated by user inputs or the like. That is, the sound output information may include the sound information that is output as application is executed by user inputs.

The comparing unit 120 may compare the priorities of the first sound output information and the second sound output information. The priority of the first sound output information may be higher than the priority of the second sound output information.

In this regard, prioritizing the sound output information received from the driving unit over the sound output information received from the infotainment unit may improve the stability of the driving.

The determining unit 130 may determine whether the first sound output information is generated while the vehicle is in motion. Here, the determining unit 130 may determine to output the second sound output information after outputting the first sound output information.

In addition, when the first sound output information is generated while the vehicle is in motion, the determining unit 130 may determine whether to output the first sound output information and the second sound output information and adjust the output timings based on the level of the first sound output information, and output as determined and adjusted.

In detail, the determining unit 130 may determine to output only the first sound output information and block the output of the second sound output information when the level of the first sound output information is the first level. Here, the levels of output information may include a first level and a second level lower than the first level.

In addition, when the level of the first sound output information is the second level, the determining unit 130 may output the first sound output information and the second sound output information during a first time period. The determining unit 130 may also determine to output the second sound output information during a second time period immediately following the first time period. Here, during the first time period, the volume of the first sound output information may be greater than that of the second sound output information. This configuration may improve the safety of driving while the vehicle is in motion.

In addition, a sound client within an operating system (such as a guest operating system) loaded (embedded) on a virtual engine (virtual environment) or host operating system may receive or request sound output information from display devices connected to each operating system. Receiving and requesting sound output information may be of the sound data required to be output.

In addition, a sound server embedded in a virtual engine, container, or base operating system may receive sound output information, i.e., sound data, and transmit the sound output information to the hardware to output sound through a speaker as an output interface. Here, the sound output information, i.e., data, may be delivered to display devices through sound clients within an operating system (such as a guest operating system) loaded (embedded) on the virtual engine or host operating system and provided to users.

In addition, the transmitting unit 140 may transmit at least one of the finally determined first sound output information and the second sound output information to the hardware. Through this, sound can be output through the front or rear sound output devices (e.g., speakers) of the vehicle.

With reference to FIGS. 15 to 19, a virtualized vehicle structure-based sound control method according to an embodiment, may include receiving at least one of the first sound output information from the first sound client and the second sound output information from the second sound client at step S510, comparing priorities of the first sound output information and the second sound output information, at step S520, and transmitting at least one of the first sound output information and the second sound output information to hardware at step S530 based on the comparison result. In the following, each step may be performed by the virtualized vehicle structure-based sound control device described above.

Here, the first sound client and the second sound client may be loaded on different virtual engines, e.g., the first sound client may be loaded on a cluster operating system while the second sound client may be loaded on an Audio Video Navigation (AVN) operating system, Co-Driver operating system, or Rear Seat Entertainment (RSE) operating system.

In addition, the priority of the first sound output information may be higher than the priority of the second sound output information.

After comparing the priorities at step S520, it is possible to determine at step S540 whether the first sound output information is generated while the vehicle is in motion.

In an embodiment, when the first sound output information is generated while the vehicle is in motion, it is possible to output the first sound output information and then output the second sound output information at step S550. For example, it may be necessary to play a notification sound from the driving unit prior to the audio playback of the infotainment part before the vehicle start moving. In this case, it is possible to output the notification from the driving unit (the first sound output information) first until a predetermined time ta and then the audio from the infotainment part (the second sound output information) after the predetermined time ta. That is, after the engine is turned on, notification sounds such as low fuel warning and consumable replacement notification may be prioritized to be output (played) before media playback such as radio in the AVN. That is, depending on the comparison result, at least one of the first sound output information and the second sound output information may be transmitted (the first sound output information being transmitted before the second sound output information during vehicle operation).

In addition, when the first sound output information is generated the vehicle is in motion, it is possible to determine whether to output the first sound output information and the second sound output information and adjust the output timings based on the level of the first sound output information and then perform output at step S570 as determined and adjusted. Here, the levels of output information may include a first level and a second level lower than the first level.

And it is possible to determine whether the level of the first sound output information is the first level. When the level of the first sound output information is the first level, it is possible to output only the first sound output information and block the output of the second sound output information at step S580.

For example, while the vehicle is in motion, it is possible to output audio (or sound) from the driving unit and mute the audio from the infotainment part. This makes it possible for the driver to be fully aware of dangerous situations, helping prevent accidents. That is, it is possible to output only the first sound output information and block the output of the second sound output information as shown in FIG. 18.

For example, while driving, in order for the driving unit malfunction warning, drowsiness prevention alert sound, etc. (the first sound output information) to be output in the state of blocking the audio from the infotainment part (the second sound output information), it is possible to transmit only the first sound output information to the hardware.

Meanwhile, when the level of the first sound output information is the second level, it is possible to output the first sound output information and the second sound output information for the first time period at step S590 and output the second sound output information continuously during the second time period immediately following the first time period at step S595.

With reference to FIG. 19, it is possible to output the first sound output information and the second sound output information up to the first time t1. Here, until the first time t1, the volume of the first sound output information may be greater than volume of the second sound output information. Accordingly, the driver may easily perceive the audio of the first sound output information.

This makes it possible for the driver to receive the first sound output information requiring immediate attention, such as lane departure warning beeps or consumable replacement notifications, in an easy manner while driving.

Furthermore, when only the second sound output information is received, the second sound output information can be transmitted to the hardware at the transmitting stage.

Here, when the display devices output audio data, there may be a priority between these devices. For example, the priority may be set in the order of AVN, RSE, and Co-drive.

For example, when only AVN performs audio output, all sound devices (speakers) of the vehicle can output the audio. And in the case where both AVN and RSE perform audio output at the same time, when the audio is output on the front of the vehicle, the front speakers of the vehicle may output AVN's audio output, and the rear speakers of the vehicle may output RSE's audio output. In addition, when both AVN and Co-drive perform audio output simultaneously, the most recent audio output between AVN and Co-drive may be output to all speakers in the vehicle.

Figure 20:
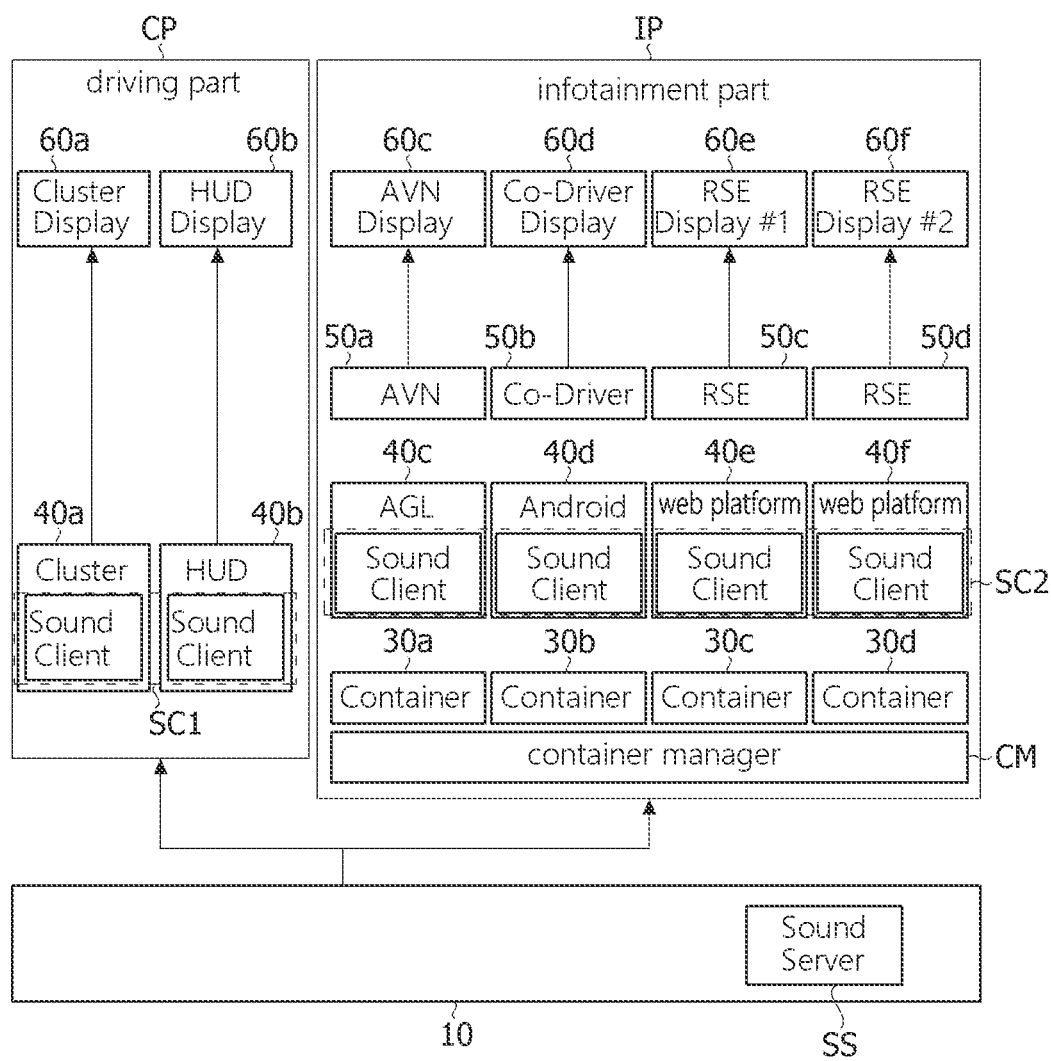
FIG. 20 is a conceptual diagram of a virtualized vehicle structure-based system according to an alternative embodiment.

FIG. 20 is a conceptual diagram of a virtualized vehicle structure-based system according to an alternative embodiment.

As described above, a virtualized vehicle structure-based system according to an embodiment may include hardware (not shown), a base operating system 10 installed on the hardware (not shown), at least one operating system 30a to 30f installed on the base operating system 10, a plurality of operating system platforms 40a to 40f installed on the at least one operating system 30a to 30f as software collections including middleware and important applications, a plurality of applications 50a to 50d operated on the operating system platforms 40a to 40f, a plurality of displays 60a to 60f that display a plurality of operating system platforms 40a to 40f or a plurality of applications, and a container manager CM that manages the environment of the plurality for operating systems 30a to 30d on the virtual engines 20a to 20b. The at least one operating system is described as a 'container'. That is, the above-described sound control may be performed with a virtualized vehicle structure-based system illustrated in FIG. 20 without the virtual engines described above.

The above-described embodiments of the present invention may be implemented in the form of a recording medium including instructions executable by a computer, such as program modules executed by a computer. Computer-readable media can be any available media that can be accessed by a computer and includes both volatile and nonvolatile media, and both detachable and non-detachable media. In addition, the computer-readable media may include computer storage media. Computer storage media may include both volatile and nonvolatile, detachable and non-detachable media implemented by any method or technology for storing information such as computer-readable instructions, data structures, program modules, or other data.

In addition, the vehicle software control device described in the embodiments may be implemented as a computer program stored in a computer-implementable storage medium. The term "module" used in the embodiments means a software or hardware component such as a Field Programmable Gate Array (FPGA) and Application Specific Integrated Circuit (ASIC), which may perform certain tasks. However, the term 'module' is not limited to software or hardware. A module may advantageously be configured to reside on the addressable storage medium or configured to be executed on one or more processors. Thus, a module may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

Although the description has been made of the embodiments, it is only given as an example and does not limit the present invention, and those skilled in the art to which the present invention belongs will know that various modifications and applications not illustrated above are possible without departing from the essential characteristics of the present embodiment. For example, each component specifically illustrated in the embodiment may be modified and implemented. And differences related to these modifications and applications should be construed as being included in the scope of the present invention as defined in the appended claims.

The invention claimed is:

1. A control method based on a virtualized vehicle structure, the method comprising:
   executing on one or more processor an operating system managing a plurality of containers residing in an addressable storage medium, the operating system:
   booting the plurality of containers;
   receiving upgrade information;
   determining a necessity for upgrade of the plurality of the containers based on a comparison between the upgrade information and previous upgrades of the plurality of the containers and on whether the upgrade is for a system directory or for a user data; and
   upgrading a system directory of the plurality of the containers through a single reception based on the necessity for upgrade;
   wherein the plurality of the containers share initialization and management.

2. The method of claim 1, wherein executing on one or more processor the operating system further comprising operating the plurality of the containers based on absence of necessity for upgrade.

3. The method of claim 1, wherein executing on one or more processor the operating system further comprising:
   performing, based on the upgrade for the system directory, user authentication after determining the necessity for upgrade; and
   receiving the system directory.

4. The method of claim 3, wherein executing on one or more processor the operating system further comprising:
   rebooting the plurality of containers; and
   returning to determining a necessity for upgrade.

5. The method system of claim 1, wherein executing on one or more processor the operating system further comprising:
   receiving, based on the upgrade for the user data, latest user data after determining the necessity for upgrade; and
   operating the plurality of the containers.

6. The method of claim 2, wherein executing on one or more processor the operating system further comprising executing an application with a display connected to the containers after operating the plurality of containers.

7. The method of claim 5, wherein operating the plurality of the containers comprises copying a modified directory among the user data to operate the plurality of the containers.

8. The method of claim 5, wherein the operating system comprises a kernel and a library.

9. The method of claim 5, wherein executing on one or more processor the operating system further comprising executing an application with a display connected to the containers after operating the plurality of containers.

* * * * *